UNITED STATES PATENT OFFICE.

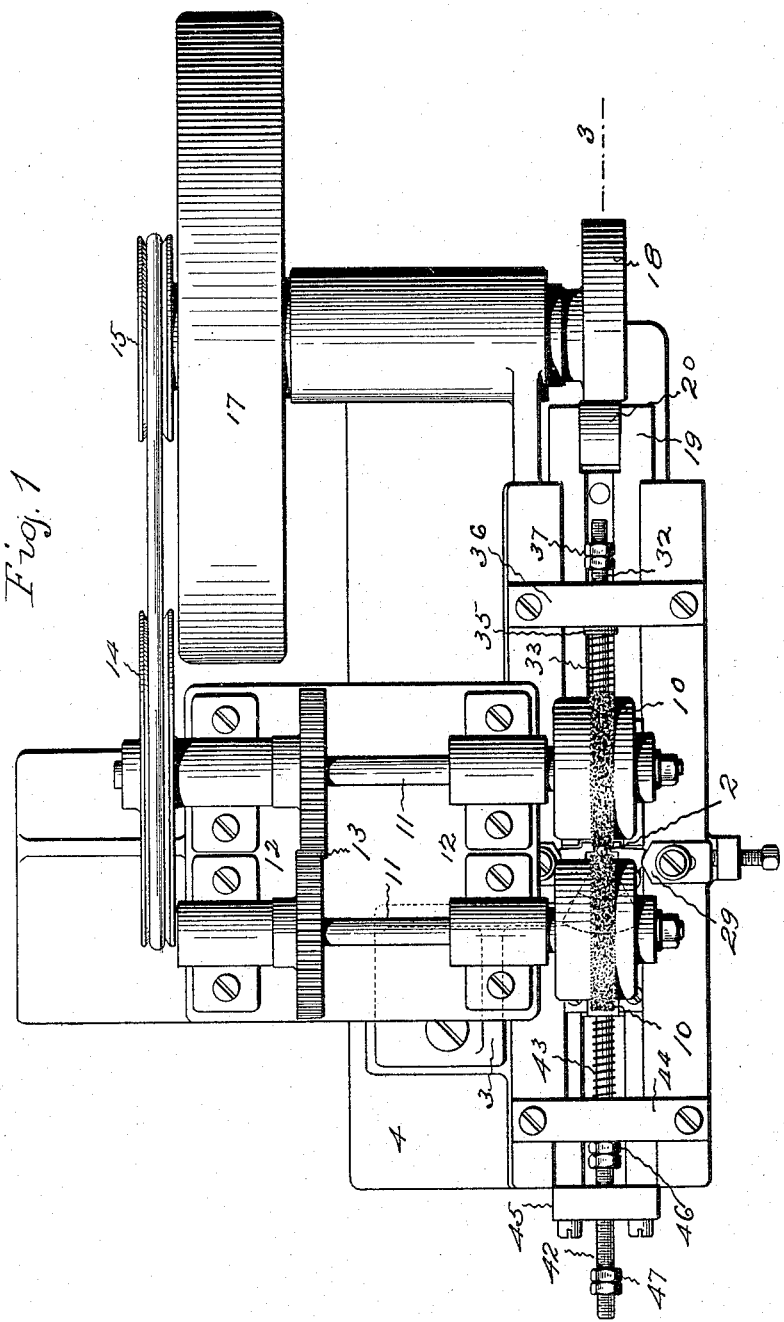

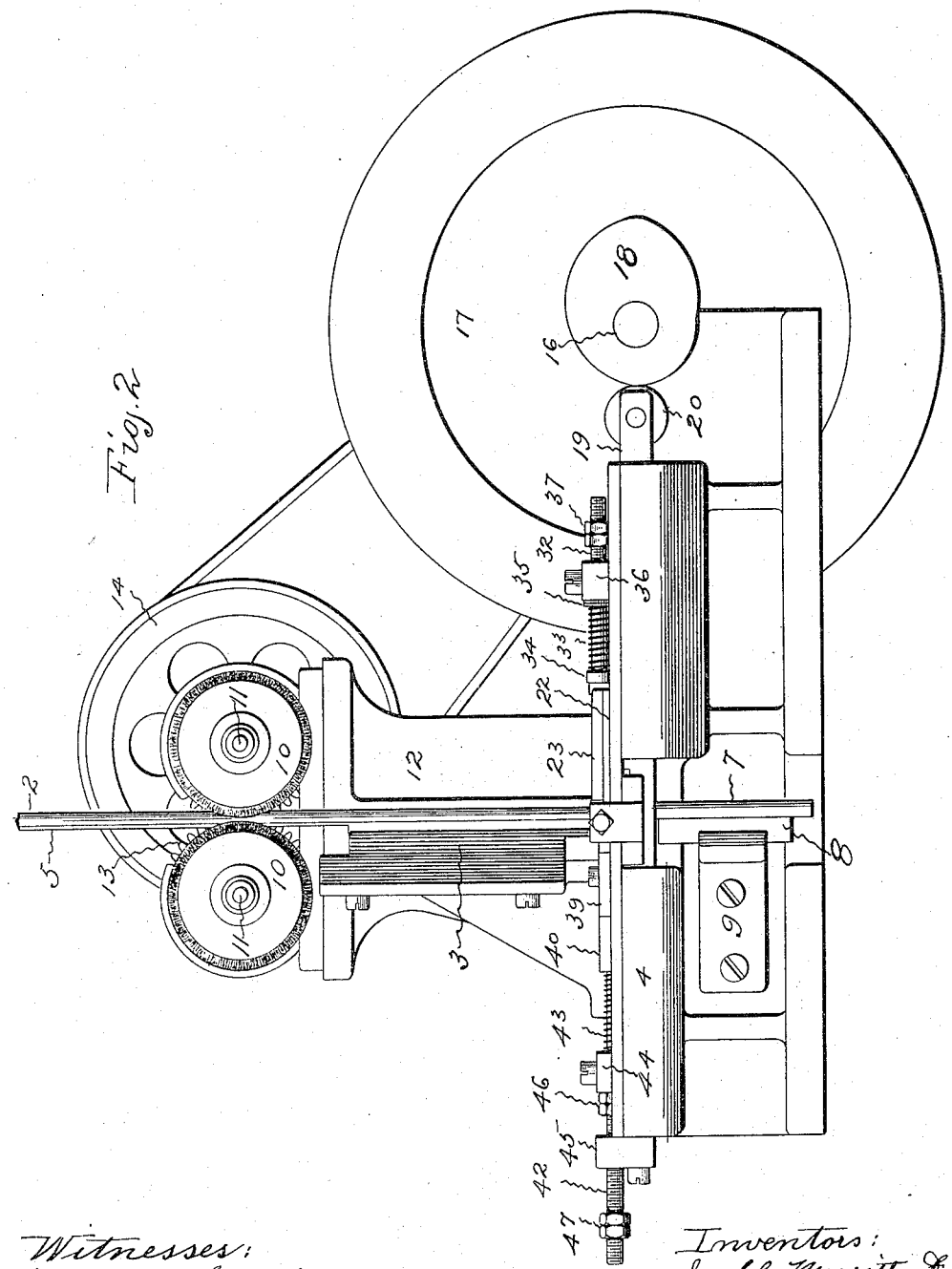

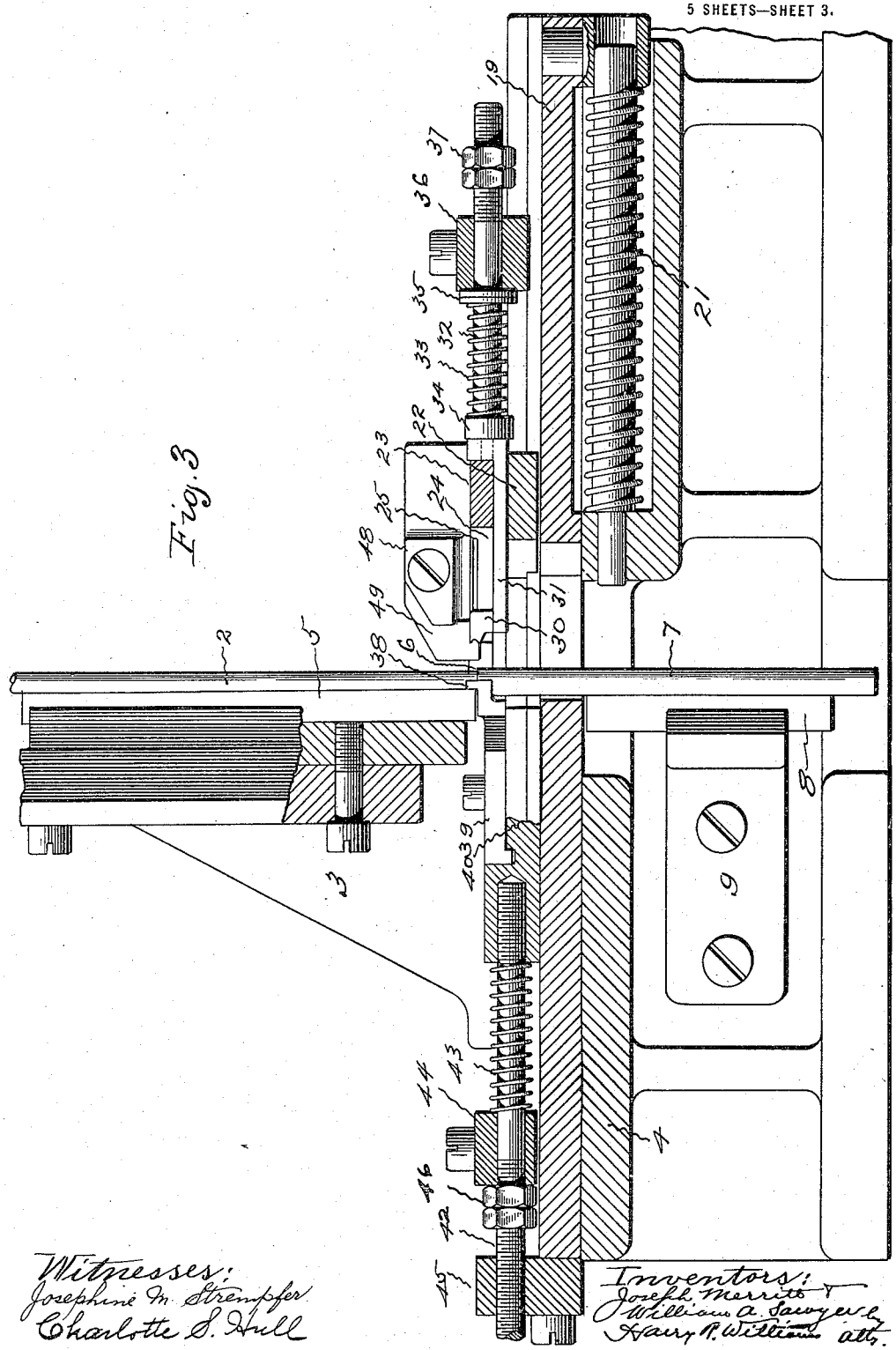

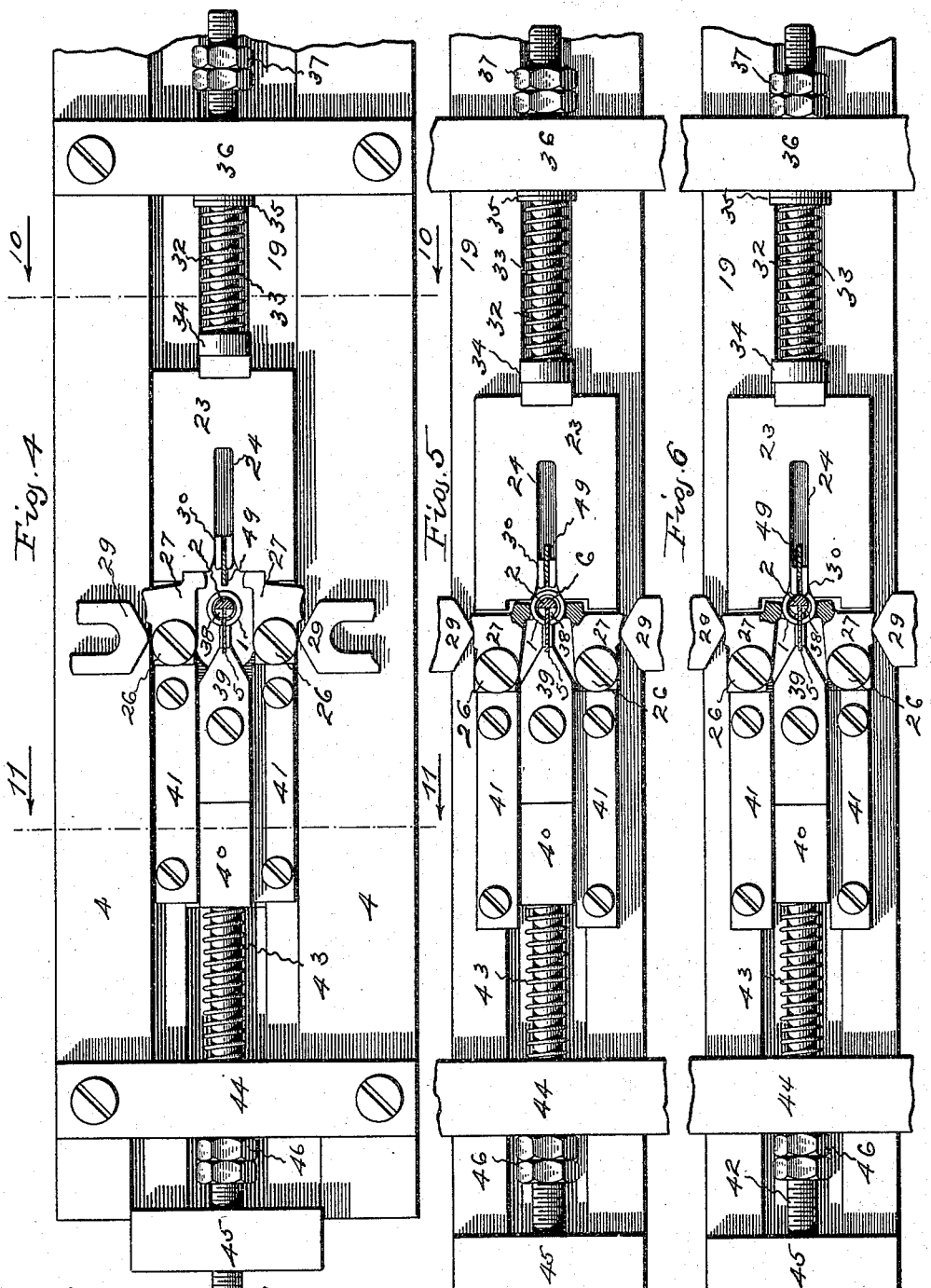

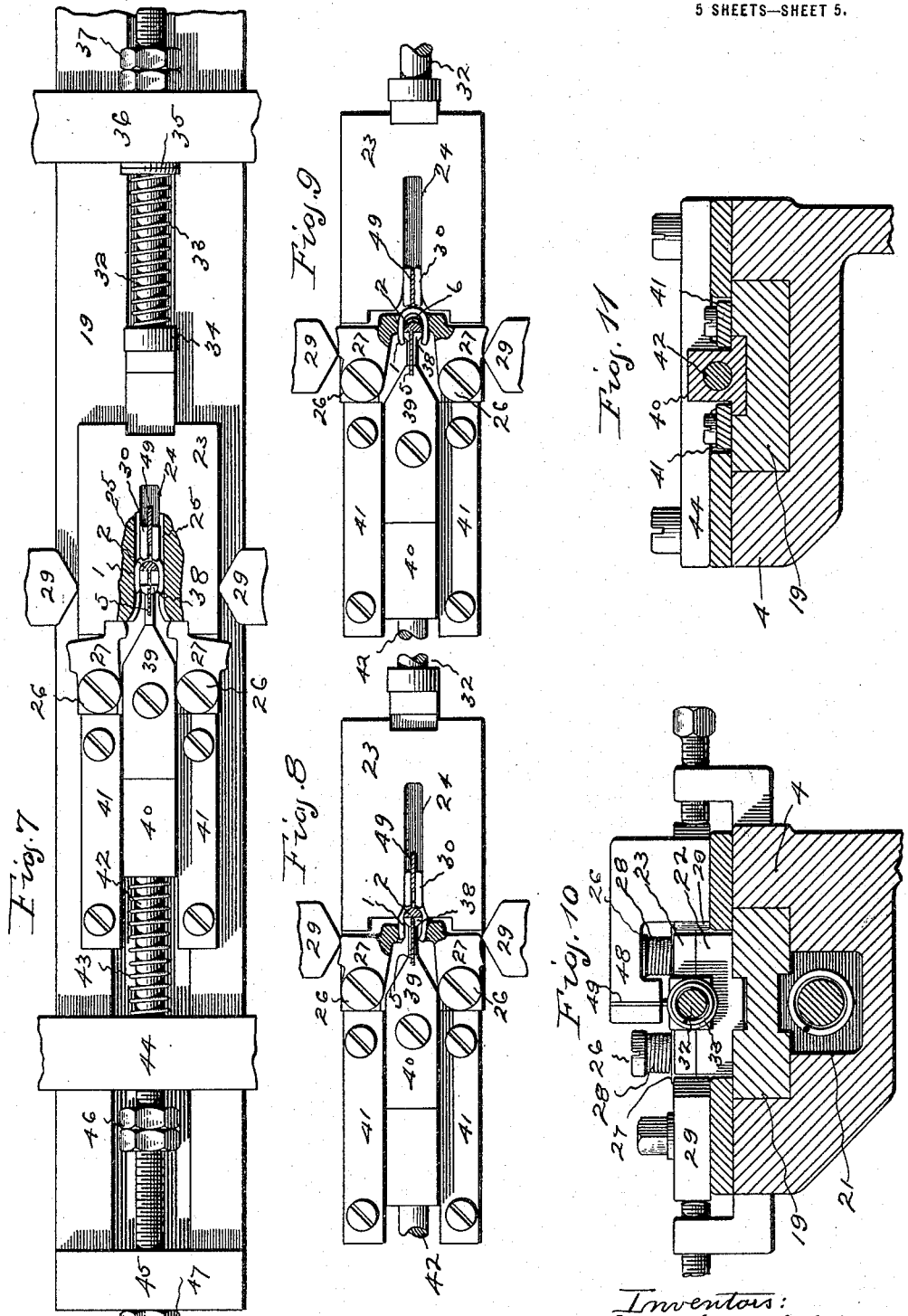

JOSEPH MERRITT, OF HARTFORD, AND WILLIAM A. SAWYER, OF WEST HARTFORD, CONNECTICUT, ASSIGNORS, BY DIRECT AND MESNE ASSIGNMENTS, TO THE HARTFORD LOCK RING COMPANY, OF HARTFORD, CONNECTICUT, A CORPORATION OF CONNECTICUT.

RING-SPREADING MACHINE.

1,161,002.          Specification of Letters Patent.      Patented Nov. 16, 1915.

Application filed April 4, 1912, Serial No. 688,489. Renewed May 25, 1915. Serial No. 30,465.

*To all whom it may concern:*

Be it known that we, JOSEPH MERRITT and WILLIAM A. SAWYER, citizens of the United States, residing at Hartford and West Hartford, respectively, in the county of Hartford and State of Connecticut, have invented a new and useful Improvement in Ring-Spreading Machines, of which the following is a specification.

This invention relates to a machine which is designed to receive split rings made either of tubing or solid stock, and to separate their ends and shape them for subsequent manipulation.

The object of the invention is to provide a simple and rapid machine which will operate on rings, particularly small rings made of light tubular stock, in such manner as to spread them and separate the ends very accurately.

In carrying out this invention, the rings are fed by suitable mechanism and one at a time dropped to an expansible section of the feed-rod between jaws which centralize them on the expansible section. The rings are then clamped from the rear so as to keep them central and while thus retained the expansible section is enlarged and the rings spread the desired amount into a holder. Then the separated ends of the rings, by the centralizing jaws, are bent inward a little and are carried back from the feed-rod, where they are released so that they will drop from the machine.

Figure 1 of the accompanying drawings shows a plan of a machine which embodies the invention. Fig. 2 shows a front elevation of the same. Fig. 3 shows on larger scale a vertical section of a part of the machine on the plane indicated by the dotted line 3—3 on Fig. 1. Fig. 4 shows a plan of the bed and moving parts with a split ring in the position occupied when it first drops to the spreading mechanism. Fig. 5 is a similar view with the parts in the positions occupied when the ring is centralized by the movable jaws on each side. Fig. 6 is a view of the same with the mechanisms advanced to the positions occupied when the ring is clamped from the rear. Fig. 7 is a similar view showing the parts in the positions occupied when the ends of the ring are spread apart. Fig. 8 is a view showing the ends of the spread ring bent inward by the jaws at the side. Fig. 9 is a view showing the side jaws carrying the spread ring back against a stop so that it may drop and make way for a following ring. Fig. 10 is a vertical section through the parts on the plane indicated by the dotted line 10—10 on Fig. 4. Fig. 11 is a similar view taken on the plane indicated by the dotted line 11—11 on Fig. 4.

The rings 1, which may be formed of tubing or wire, desirably the former, are by suitable means deposited one upon the other on the rod 2, which is supported vertically by a bracket 3 that is attached to the top of the bed 4 of the machine. (Fig. 2). This rod has a feather 5 on one side which enters between the open ends of the split rings so as to hold them all in the same relative position as they are fed down. At the bottom of the feed-rod 2 just above the plane of the top of the bed is a small retaining shoulder 6. This shoulder is desirably formed by the upper end of the discharge rod 7 which is slightly larger than but practically is a continuation of the feed-rod 2. The discharge rod has a wing 8 which is held by a bracket 9 that is fastened to the machine frame. (Fig. 3).

The rings are fed down the rod 2 by gravity and assisted for increasing the rapidity and sureness of the feed by the revolving brushes 10. These brushes are mounted on arbors 11 which are supported by bearings at the top of the standard 12. The arbors bear intermeshing gears 13 and on one of the arbors is a wheel 14 which is belted to a wheel 15 on the driving shaft 16 upon which is the driving pulley 17. The driving shaft is held in bearings at one end of the bed, and on the end opposite from the driving pulley it carries a cam 18. By means of the brushes which are rotated by this mechanism, the rings are crowded down on the feed-rod 2 to the retaining shoulder 6 at the top of the discharge rod 7. (Figs. 1, 2).

Extending across the bed and movable longitudinally in a suitable guide-way is a slide 19. This slide is moved in one direction by the cam 18, the periphery of which engages the roll 20 at the end of the slide.

A spring 21 arranged in a recess in the bed thrusts the slide back and holds the roll against the cam.

Secured to and movable with the slide is a block 22, and fastened on the top of the block is a plate 23. This plate has a longitudinal slot 24 with grooves 25 in the side walls of the slot. (Figs. 3, 7, 10).

Pivoted to the block 22 by screw studs 26 are jaws 27. These jaws are normally thrown out by springs 28, (Fig. 10), coiled on the pivot screws. As the slide is moved by the cam from the position shown in Fig. 4 toward the left, the outer edges of these jaws engage wedges 29 that are adjustably fastened on the top of the bed, and are forced toward each other. As the feather 5 extends between the ends of the ring and the jaws move up equal distances, the ring by these three points, the feather and two jaws, is centralized on the rod 2 above the shoulder 6, as shown in Fig. 5. At this time the plate 23 has moved up with the slide so that the front edges of the slot are adjacent to the sides of the ring. After the pivoted jaws on each side have swung together and have centralized the ring, a pair of jaws 30 are forced against the back of the ring so as to clamp it to the feed-rod. (Fig. 6). These clamping jaws are mounted on a bar 31 that is loosely held between the block 22 and the plate 23. (Fig. 3). Fastened to this bar is a rod 32, on which is a spring 33 that thrusts between a collar 34 fast on the rod and washers 35 that bear against a plate 36 that is fastened to the bed and bridges the slide. (Figs. 3, 7, 10). The movement of the block and plate with the slide permits the bar to be thrust forward by the spring 33 so that the jaws will clamp the ring against the feed-rod as described. A pair of nuts 37 on the threaded end of the rod 32 are adjusted to limit the forward movement of the rod and the bar bearing the jaws. (Figs. 3, 5). As the slide carries the plate past the feed-rod, the sides of the ring enter the grooves 25 in the walls of the slot 24 in this plate. (Fig. 7).

The feed-rod is cut away so as to be semi-cylindrical just above the shoulder where the ring lodges. Occupying this recess and completing the cylinder, and practically forming a continuation of the rod, is a semi-cylindrical stud 38 which projects from a plate 39 that is secured to the block 40. (Figs. 3, 6, 7). This stud is slotted vertically to receive the lower end of the feather 5. The block is movable on the slide 19, being held by gibs 41, (Fig. 11), and fastened to it is a rod 42. On this rod is a spring 43 that thrusts between the back of the block 40 and the plate 44 that is fastened to the bed and bridges the slide. On the threaded end of the rod between this bridge-plate and a wall 45 fastened at the end of the slide are a pair of nuts 46 which limit the forward movement of the rod and block which carries the semi-cylindrical stud. On the outer end of the rod 42 are a pair of nuts 47 which, when the slide is moved way over, are engaged by the wall 45 in such manner as to draw back the rod and block which carries the semi-cylindrical stud. The spring 43 normally holds the semi-cylindrical stud in the recess in the feed-rod. When the slide is moved so that the wall 45 engages one of the nuts 47, the semi-cylindrical stud is drawn out of the recess in the feed-rod in such manner that it practically expands the feed-rod and spreads the ring and separates the free ends into the grooves in the walls of the slot in the plate that is carried by the slide, which grooves hold the sides of the ring straight as shown in Fig. 7. At this time, the pivoted centralizing jaws being away from the fixed wedges are thrown open by their springs. The ring having been spread and the ends sufficiently separated, the slide starts back under the influence of the main spring 21, the driving cam being timed to permit this. As the slide moves back, the spring 43 forces the semi-cylindrical stud back into the recess in the feed-rod. When the slide has gone back a sufficient distance to carry the plate 23 almost off from the ring, the pivoted jaws on the sides again engage the fixed wedges and are swung in so as to slightly bend toward each other the separated ends of the ring. (Fig. 8). As the slide continues to move back, the plate is carried away from the ring that has been spread, and at the same time the clamping jaws are carried back from the ring. The movement of the centralizing jaws with the slide, which are still holding the spread ring, carries the ring a slight distance back so that it is beyond the shoulder 6 and is free to drop down the discharge rod out of the machine. A bracket 48 is fastened to the top of the bed of the machine so as to project over the slide. (Figs. 3, 10). This bracket supports a thin plate 49 that extends down between the clamping jaws. (Figs. 3, 9). This plate engages the rear of the spread ring when the slide is moved back and the pivoted jaws are carrying the ring off from the shoulder, so as to strip the ring from the clamp jaws and insure that it drops down the discharge rod. The wing 8, which is used to attach the discharge rod 7 to the supporting bracket 9 that is fastened to the frame, causes the rings to all drop down the same, that is, this wing insures that the spread ends of the rings as they pass down remain in line. (Figs. 2, 3). As fast as one ring is spread and drops down, a ring above drops into its place and is spread. This machine is very rapid. There are comparatively few operating parts, and they are so arranged that the rings are spread and bent very accurately and are discharged in a suitable manner to be subsequently acted upon.

The invention claimed is:

1. A ring spreading machine having a feed-rod with an expansible section, a shoulder adjacent to the expansible section for retaining the rings while they are being expanded, and means for transversely moving the expansible section of the rod and thus expanding the rings.

2. A ring spreading machine, having a feed-rod with a feather for causing the rings to feed with all of the ends in the same line, a movable part forming a continuation of a section of the feed-rod, and mechanism for separating said movable part from the feed-rod for spreading the rings.

3. A ring spreading machine having a feed-rod with a ring retaining shoulder, an expansible section above said shoulder, means for enlarging the expansible section of the rod and spreading the rings, and means for dislodging the spread rings from said shoulder.

4. A ring spreading machine having a feed-rod with a transversely movable expansible section, means movable toward opposite sides of the exteriors of the rings for centralizing the rings on said expansible section, means for holding the rings centralized, and means for enlarging the expansible section of the rod and spreading the rings.

5. A ring spreading machine having a feed-rod with an expansible section, means for clamping the rings to said expansible section of the rod, means for enlarging the expansible section of the rod and spreading the rings, and means for holding the rings and limiting the amount of spread thereof.

6. A ring spreading machine having a feed-rod with an expansible section, means for clamping the rings to said expansible section of the rod, means for enlarging the expansible section of the rod and spreading the rings, means for holding the rings and limiting the amount of spread thereof, and means for bending the ends of the expanded rings inwardly.

7. A ring spreading machine having a feed-rod with an expansible section, means for centralizing the rings on said expansible section, means for holding said rings centralized, means for enlarging the expansible section of the rod and spreading the rings, means for holding the rings and limiting the amount of spread thereof, and means arranged to cause the centralizing means to bend inwardly the ends of the rings.

8. A ring spreading machine having a feed-rod with an expansible section, means for enlarging the expansible section of the rod and thus spreading the rings, a shoulder for retaining the rings, and brushes for crowding the rings on the feed-rod toward the retaining shoulder.

9. A ring spreading machine having a feed-rod, a discharge-rod practically in continuation with the feed-rod and providing a retaining shoulder at the top of the discharge-rod and bottom of the feed-rod, an expansible section above said shoulder, means for enlarging the expansible section of the rod and spreading the rings lodged on said shoulder, and means for dislodging the spread rings from said shoulder and allowing them to feed down the discharge-rod.

10. A ring spreading machine having a feed-rod, a movable part forming a continuation of a section of the feed-rod, mechanism for separating said movable part from the feed-rod for spreading the rings, a clamp for holding the rings against the feed-rod in the plane of the separable ring spreading part, a holder for engaging the outside of the rings and limiting the amount of spread, means for bending inwardly the ends of the spread rings, means for carrying the spread rings back from the feed-rod after they have been spread, and a stop for limiting the backward movement of the rings and causing them to be ejected from the machine.

11. A ring spreading machine having a feed-rod with an expansible section, means for enlarging the expansible section of the rod and separating the ends of the rings, and a grooved plate for holding the sides of the rings and preventing them from undue spreading while the ends are being separated.

12. A ring spreading machine having a vertical feed rod with a section between the ends of the rod transversely movable, means for opening said transversely movable section of the rod and separating the ends of the rings, and means engaging the sides of the rings to prevent undue spreading while the ends are being separated.

13. A ring spreading machine having a feed-rod with an expansible section, a guiding feather adapted to extend between the ends of the rings, and means adapted to engage the sides of the rings and in coöperation with the feather centralize the rings on the feed rod.

JOSEPH MERRITT.
WILLIAM A. SAWYER.

Witnesses:
CHARLOTTE S. HULL,
CHARLES H. STORRS.